Sept. 5, 1933.  R. E. SMITH  1,925,882
VARYING SPEED OF CAPACITOR MOTORS
Filed Jan. 22, 1931
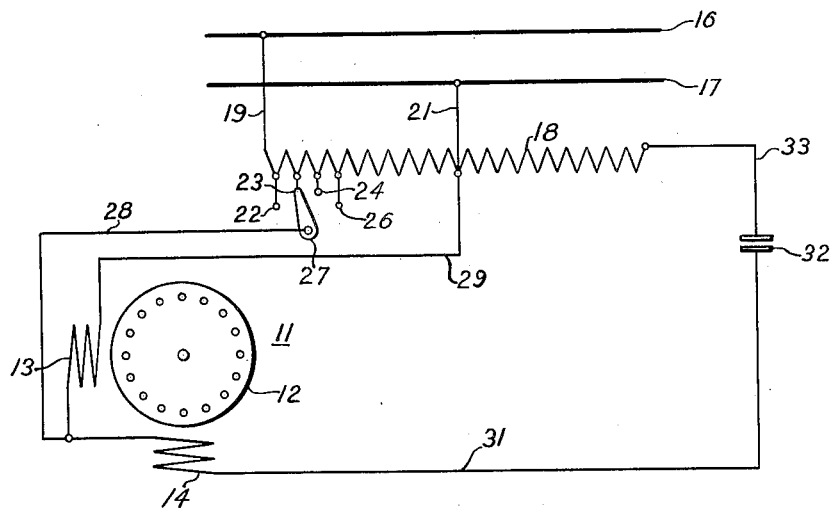
WITNESSES
INVENTOR
Raymond E. Smith
BY
ATTORNEY Patented Sept. 5, 1933

1,925,882

UNITED STATES PATENT OFFICE 1,925,882

VARYING SPEED OF CAPACITOR MOTORS

Raymond E. Smith, Springfield, Mass., assignor to Westinghouse Electric & Manufacturing Company, a corporation of Pennsylvania Application January 22, 1931. Serial No. 510,436

2 Claims. (Cl. 172—233)

My invention relates to alternating-current motors and more particularly to means for varying the speed of induction motors.

An object of my invention is to provide a relatively simple and compact means in a capacitor motor for varying the speed thereof.

In practicing my invention, I provide, in combination with a capacitor motor embodying a rotor, a main stator energizing field winding and an auxiliary field winding connected to a condenser, and an auto-transformer provided with taps to permit of connecting a larger or smaller number of turns in circuit with the motor-energizing windings.

The single figure of the drawing illustrates, schematically, a motor embodying my invention.

A motor 11, which is preferably of the capacitor type, embodies a rotor 12, here shown as of the squirrel-cage type. No shaft or bearings are shown, as these constitute no part of my invention and any standard or usual devices of this kind may be utilized.

A main stator-energizing field winding 13 and an auxiliary stator-energizing field winding 14 are provided, both field windings being wound in mechanically or electrically displaced relation on a usual laminated stator core of the kind utilized in alternating-current motors of this type. I have illustrated the stator windings 13 and 14 generally only, as such windings and the details of the stator structure constitute no particular part of my present invention.

A supply circuit includes conductors 16 and 17 having a suitable electric potential difference therebetween and being of the single-phase type. A transformer 18, which may be an autotransformer, is shown schematically only as having a single winding, it being understood that a usual or standard type of laminated core may be employed. A conductor 19 connects supply-circuit conductor 16 to one terminal of the autotransformer winding, and a conductor 21 connects supply-circuit conductor 17 to a tap which is connected to a midpoint of the winding. Thus, if the voltage of the supply circuit is 110 volts, this voltage will be applied to substantially one-half of the winding of transformer 18 so that the voltage across the extreme terminals of the transformer winding will be substantially 220 volts.

The winding of transformer 18, and particularly that portion connected to conductor 19, is provided with a plurality of taps and fixed contact members 22, 23, 24 and 26 which may be selectively engaged by a manually movable switch lever 27. Switch lever 27 is connected, by a conductor 28, to the junction of windings 13 and 14, while the midpoint of the winding of transformer 18 is connected, by a conductor 29, to the other terminal of main winding 13. The other terminal of auxiliary winding 14 is connected, by a conductor 31, to one terminal of a condenser 32, the other terminal of which is connected, by a conductor 33, to the extreme outer terminal of the winding of transformer 18.

The hereinbefore described system is particularly effective in the speed control of a motor of the type above designated and it may be noted that the main field winding is energized at substantially 110 volts if switch arm 27 is in engagement with contact terminal 22, while the voltage across the circuit including auxiliary winding 14 and condenser 32 is much higher, so that substantially 220 volts will be applied to the terminals of condenser 32 if conductor 21 is connected to the midpoint of winding of transformer 18. This, of course, results in making the condenser much smaller, it being well understood in the art that the capacity of such condenser varies inversely as the square of the voltage applied thereto.

If it be assumed that switch arm 27 is initially in engagement with contact terminal 22, the full voltage of the respective portions of the transformer will be supplied to the respective motor circuits. If now, switch arm 27 is moved to the position shown in the drawing, the number of turns of winding 18 in the two circuits will be reduced, and it may be noted that the percentage of reduction in the number of turns between conductors 19 and 21 will be twice that in the entire winding of the transformer, or, in other words, the percentage variation in the voltage applied to the main and to the auxiliary windings will be different for the two windings, the percentage of variation for the auxiliary field being less than that for the main field winding.

I have found that this method of regulation is easily effected and that it will vary the speed of the motor as desired.

It is apparent, of course, that, by increasing the number of turns in the winding of transformer 18 to a greater ratio than two to one, as has been assumed in the present instance, it is possible to increase the voltage applied to the condenser 32 and thereby still further reduce the capacity and size of the condenser. However, the same general conditions apply to the different percentage variations in the voltages applied to the main and to the auxiliary stator field windings.

Since my invention may be variously modified without departing from its spirit and scope, I desire that only such limitations shall be placed thereon as are embodied in the prior art or are set forth in the appended claims.

I claim as my invention:

1. In combination with an induction motor including a main field winding, an auxiliary field winding and a condenser connected to the auxiliary field winding, a transformer, connections between the transformer winding and the field windings and the condenser whereby the main winding is energized at a lower voltage than the combination of the auxiliary winding and the condenser and switching means between the two field windings and one end of the transformer winding to effect simultaneous variation of the voltages applied to the respective field windings, the percentage variation of voltage for the main field winding being less than for the combination of auxiliary field winding and condenser.

2. In combination with an induction motor including a main field winding, an auxiliary field winding and a condenser connected in series circuit with the auxiliary field winding, a transformer, taps on the transformer, electrical connections between the field windings and the transformer connecting the field windings in fixed relation to each other and to the transformer to effect energization of the main field winding at a lower voltage than that applied to the combination of the auxiliary field winding and condenser, said permanent connections including switching means connected to the main and the auxiliary field windings and selectively engaging the taps to vary simultaneously and in different degrees, the voltages applied to the two field windings.

RAYMOND E. SMITH.